United States Patent
Samuel et al.

(10) Patent No.: US 10,098,180 B2
(45) Date of Patent: Oct. 9, 2018

(54) PORTABLE WIRELESS SIGNAL TRANSFER SYSTEM, METHOD AND TERMINAL

(71) Applicant: Hytera Communications Corp., Ltd., Shenzhen, Guangdong (CN)

(72) Inventors: Chia Han Siong Samuel, Shenzhen (CN); Phaik Ee Ooi, Guangdong (CN); Yan Xu, Shenzhen (CN)

(73) Assignee: Hytera Communications Corporation Limited, Shenzhen, Guangdong (CN)

( * ) Notice: Subject to any disclaimer, the term of this patent is extended or adjusted under 35 U.S.C. 154(b) by 370 days.

(21) Appl. No.: 14/899,366

(22) PCT Filed: Jun. 20, 2013

(86) PCT No.: PCT/CN2013/077555
§ 371 (c)(1),
(2) Date: Dec. 17, 2015

(87) PCT Pub. No.: WO2014/201658
PCT Pub. Date: Dec. 24, 2014

(65) Prior Publication Data
US 2016/0150592 A1 May 26, 2016
US 2017/0171914 A9 Jun. 15, 2017

(51) Int. Cl.
*H04W 88/04* (2009.01)
*H04W 40/22* (2009.01)

(52) U.S. Cl.
CPC ........... *H04W 88/04* (2013.01); *H04W 40/22* (2013.01)

(58) Field of Classification Search
CPC .............................. H04W 40/22; H04W 88/04
See application file for complete search history.

(56) References Cited

U.S. PATENT DOCUMENTS

2007/0268846 A1 11/2007 Proctor, Jr. et al.
2008/0075094 A1* 3/2008 Ahn ...................... H04B 7/155
370/400

(Continued)

FOREIGN PATENT DOCUMENTS

CN 101034931 A 9/2007
CN 101110625 A 1/2008

(Continued)

OTHER PUBLICATIONS

Author Unknown, IEEE 802.16j, pp. 1-314, 2009.*

(Continued)

*Primary Examiner* — Christopher Crutchfield
(74) *Attorney, Agent, or Firm* — Wolf, Greenfield & Sacks, P.C.

(57) ABSTRACT

A portable wireless signal transfer system, method and terminal. The method comprises: a first terminal receiving a wireless signal; the first terminal demodulating the wireless signal to obtain burst data and a timeslot number; the first terminal sending the burst data and the timeslot number to a second terminal; the second terminal receiving the burst data and the timeslot number sent by the first terminal; the second terminal performing signal modulation on the burst data; and the second terminal transmitting a signal obtained after the signal modulation in a corresponding timeslot according to the timeslot number. The wireless signal transfer function of a conventional transfer stage can be achieved using two portable terminals, which have the advantages of being easy to carry, economic, flexible, etc., and the application requirements of a conventional communication system are fully adapted.

10 Claims, 8 Drawing Sheets

(56) References Cited

U.S. PATENT DOCUMENTS

| | | | |
|---|---|---|---|
| 2009/0181693 A1* | 7/2009 | So | H04L 45/124 |
| | | | 455/453 |
| 2009/0219916 A1 | 9/2009 | Bohn | |
| 2009/0262689 A1* | 10/2009 | Jeong | H04W 40/22 |
| | | | 370/329 |
| 2009/0303918 A1* | 12/2009 | Ma | H04B 7/2606 |
| | | | 370/315 |
| 2012/0002684 A1 | 1/2012 | Tay | |

FOREIGN PATENT DOCUMENTS

| | | |
|---|---|---|
| CN | 102711134 A | 10/2012 |
| CN | 102724666 A | 10/2012 |
| CN | 103139792 A | 6/2013 |
| CN | 103312406 A | 9/2013 |
| EP | 2605572 A1 | 6/2013 |
| WO | WO 99/52308 | 10/1999 |

OTHER PUBLICATIONS

Extended European Search Report, dated Jun. 15, 2016, from corresponding European Patent Application No. 13887065.4.
Chinese Office Action, dated Aug. 3, 2015, from corresponding Chinese Patent Application No. 201310247557.0.
International Search Report, dated Mar. 3, 2014, from corresponding International Application No. PCT/CN2013/077555.

\* cited by examiner

PORTABLE WIRELESS SIGNAL TRANSFER SYSTEM, METHOD AND TERMINAL

CROSS-REFERENCE TO THE RELATED APPLICATIONS

This application is the US national phase of International Application No. PCT/CN2013/077555, entitled "PORTABLE WIRELESS SIGNAL TRANSFER SYSTEM, METHOD AND TERMINAL", filed on Jun. 20, 2013, which application is hereby incorporated by referenced to the maximum extent allowable by law.

FIELD

The present disclosure relates to the field of communications technology, especially to a portable system for forwarding a wireless signal, a method for transferring a wireless signal and a terminal thereof.

BACKGROUND

In a current professional wireless communication system, a communication distance of a terminal is limited. In the case where the terminal is out of coverage of a transmitter terminal or at the edge of a valid area, a situation of a weak signal or no signal occurs, thus the quality of a call is very bad or a call can not even be established. Under the circumstance, a repeater is needed to amplify and forward the signal, to enlarge the communication range and ensure the stability and reliability of communications.

A repeater is basically configured to forward a received signal by a transmitter of its own, and required to operate in accordance with a prescriptive forwarding protocol to achieve a forwarding function. And a major feature thereof is that it can effectively enlarge the communication range and capability of a handset, a vehicle station and a fixed station in a communication system, providing a larger coverage radius for the system.

An ordinary repeater includes units of a receiver, a transmitter, a duplexer, a power divider and an antenna feeder. Such devices usually operate in an unattended state, some of them are placed on a high mountain with bad operating environment and some of the devices are sometimes kept in a transmitting state for a very long time. Thus, the technical design requirement of a repeater is much higher than that of a handhold terminal or a vehicle-station, and there are even some special requirements, such as a high stability, a high reliability, excellent heat dissipation and a longtime stable operation at a high temperature or a low temperature. Therefore, an ordinary repeater usually has a very large volume, a bad movability and a high cost, and is unsuitable to be applied in a complex and changeable conventional system.

SUMMARY

A portable system for forwarding a wireless signal, a method for forwarding a wireless signal and a terminal thereof are provided according to embodiments of the disclosure, to solve the problem that a conventional system for forwarding a wireless signal has a high cost and is cumbersome.

A portable system for forwarding a wireless signal is provided in a first aspect of the disclosure, which includes a first terminal and a second terminal.

The first terminal includes:
a first receiving unit, configured to receive a wireless signal;
a first demodulation unit, configured to demodulate the wireless signal, to obtain burst data and a timeslot number; and
a first data transmission unit, configured to send the burst data and the timeslot number to the second terminal.

The second terminal includes:
a second data transmission unit, configured to receive the burst data and the timeslot number sent by the first data transmission unit;
a second modulation unit, configure to perform a signal modulation on the burst data; and
a second transmitting unit, configured to transmit a signal obtained through the signal modulation, in a timeslot corresponding to the timeslot number.

In a first possible implementation, the first data transmission unit is further configured to receive mode switch request information sent by the second terminal, and reply mode switch acknowledgement information to the second terminal.

The first terminal further includes:
a first operation mode switching unit, configured to switch an operation mode of the first terminal to a transmitter operation mode in response to the mode switch request.

The second data transmission unit is further configured to send the mode switch request information to the first terminal and receive the mode switch acknowledgement information.

The second terminal further includes:
a second operation mode switching unit, configured to switch an operation mode of the second terminal to a receiver operation mode in response to the mode switch acknowledgement information;
a second receiving unit, configured to receive a wireless signal; and
a second demodulation unit, configured to demodulate the wireless signal received by the second receiving unit, to obtain burst data and a timeslot number.

The second data transmission unit is further configured to send the burst data and the timeslot number obtained by the demodulating of the second demodulation unit to the first terminal.

In the case where the first terminal operates in the transmitter operation mode, the first data transmission unit is further configured to receive the burst data and the timeslot number sent by the second data transmission unit, and the first terminal further includes:
a first modulation unit, configured to perform a signal modulation on the burst data sent by the second data transmission unit; and
a first transmitting unit, configured to transmit a signal obtained through the signal modulation performed by the first modulation unit in a timeslot corresponding to the timeslot number sent by the second data transmission unit.

In a second possible implementation based on the first possible implementation in the first aspect, the first data transmission unit is further configured to receive battery voltage request information from the second terminal, and reply information on a battery voltage of the first terminal to the second terminal.

The second terminal further includes:
a first determination unit, configured to compare the battery voltage of the first terminal with that of the second terminal to determine whether the battery voltage of the first terminal minus that of the second terminal is greater than a predetermined value.

And the second data transmission unit is further configured to send the mode switch request information to the first terminal in the case where the determination unit determines that the battery voltage of the first terminal minus that of the second terminal is greater than the predetermined value.

In a third possible implementation based on the first possible implementation in the first aspect, the second terminal further includes:

a timing unit, configured to calculate a total transmitting time of the second terminal; and a second determination unit, configured to determine whether the total transmitting time of the second terminal is longer than a predetermined time.

And the second data transmission unit is further configured to send the mode switch request information to the first terminal in the case where the second determination units determines that the total transmitting time of the second terminal is longer than the predetermined time.

A terminal is provided in a second aspect of the disclosure. The terminal includes:

a first receiving unit, configured to receive a wireless signal;

a first demodulation unit, configured to demodulate the wireless signal, to obtain burst data and a timeslot number; and a first data transmission unit, configured to send the burst data and the timeslot number to a second terminal, for the second terminal to perform a signal modulation on the burst data and transmit a signal obtained through the signal modulation in a timeslot corresponding to the timeslot number.

In a first possible implementation, the terminal further supports a transmitter operation mode; and the first data transmission unit is further configured to receive mode switch request information sent by the second terminal, and reply mode switch acknowledgement information to the second terminal.

The terminal further includes:

a first operation mode switching unit, configured to switch an operation mode of the terminal to the transmitter operation mode in response to the mode switch request information.

In the case where the terminal operates in the transmitter operation mode, the first data transmission unit is further configured to receive burst data and a timeslot number sent by the second terminal, and the terminal further includes:

a first modulation unit, configured to perform a signal modulation on the burst data sent by the second terminal; and a first transmitting unit, configured to transmit a signal obtained through the signal modulation performed by the first modulation unit, in a timeslot corresponding to the timeslot number sent by second terminal.

A terminal is provided in a third aspect of the disclosure. The terminal includes:

a second data transmission unit, configured to receive burst data and a timeslot number sent by a first terminal, where the burst data and the timeslot number are obtained by the first terminal demodulating a wireless signal received by the first terminal;

a second modulation unit, configured to perform a signal modulation on the burst data; and a second transmitting unit, configured to transmit a signal obtained through the signal modulation, in a timeslot corresponding to the timeslot number.

In a first possible implementation, the terminal supports a receiver operation mode, and the second data transmission unit is further configured to send mode switch request information to the first terminal and receive mode switch acknowledgement information replied by the first terminal.

The terminal further includes:

a second operation mode switching unit, configured to switch an operation mode of the terminal to the receiver operation mode in response to the mode switch acknowledgement information, and in the case where the terminal operates in the receiver operation mode, the terminal further includes:

a second receiving unit, configured to receive a wireless signal; and a second demodulation unit, configured to demodulate the wireless signal received by the second receiving unit, to obtain burst data and a timeslot number.

The second data transmission unit is further configured to send the burst data and the timeslot number obtained by the demodulating of the second demodulation unit to the first terminal.

A method for forwarding a wireless signal is provided in a fourth aspect of the disclosure, which includes:

receiving, by a first terminal, a wireless signal;

demodulating, by the first terminal, the wireless signal, to obtain burst data and a timeslot number;

sending, by the first terminal, the burst data and the timeslot number to a second terminal;

receiving, by the second terminal, the burst data and the timeslot number sent by the first terminal;

performing, by the second terminal, a signal modulation on the burst data; and transmitting, by the second terminal, a signal obtained through the signal modulation in a timeslot corresponding to the timeslot number.

In a first possible implementation, receiving, by the first terminal, the wireless signal includes: receiving, by the first terminal, the wireless signal in a first timeslot of a first frequency point.

And transmitting, by the second terminal, the signal obtained through the signal modulation in the timeslot corresponding to the timeslot number includes: transmitting, by the second terminal, the signal obtained through the signal modulation, in a second timeslot by using the first frequency point.

In a second possible implementation, receiving, by the first terminal, the wireless signal includes:

receiving, by the first terminal, a first wireless signal in a first timeslot of a first frequency point; and receiving, by the first terminal, a second wireless signal in a second timeslot of the first frequency point.

Demodulating, by the first terminal, the wireless signal, to obtain burst data and the timeslot number includes:

demodulating, by the first terminal, the first wireless signal, to obtain first burst data and a first timeslot number; and demodulating, by the first terminal, the second wireless signal, to obtain second burst data and a second timeslot number.

And transmitting, by the second terminal, the signal obtained through the signal modulation, in the timeslot corresponding to the timeslot number includes:

transmitting, by the second terminal, a signal obtained through the signal modulation performed on the first burst data, in the first timeslot by using a second frequency point; and transmitting, by the second terminal, a signal obtained through the signal modulation performed on the second burst data, in the second timeslot by using a second frequency point.

In a third possible implementation based on the fourth aspect, or the first or second possible implementation of the fourth aspect, the method further includes:

sending, by the second terminal, mode switch request information to the first terminal;

switching, by the first terminal, an operation mode to a transmitter operation mode and replying, by the first terminal, mode switch acknowledgement information to the second terminal; and receiving, by the second terminal, the mode switch acknowledgement information replied by the first terminal and switching, by the second terminal, an operation mode to a receiver operation mode.

In a fourth possible implementation based on the third possible implementation, the method further includes:

receiving, by the second terminal, a wireless signal;

demodulating, by the second terminal, the wireless signal received by the second terminal, to obtain burst data and a timeslot number;

sending, by the second terminal, the burst data and the timeslot number obtained by demodulating the wireless signal received by the second terminal to the first terminal;

receiving, by the first terminal, the burst data and the timeslot number sent by the second terminal;

performing, by the first terminal, a signal modulation on the burst data sent by the second terminal; and transmitting, by the first terminal, a signal obtained through the signal modulation performed on the burst data sent by the second terminal, in a timeslot corresponding to the timeslot number sent by the second terminal.

In a fifth possible implementation based on the third possible implementation, before sending, by the second terminal, the mode switch request information to the first terminal, the method further includes:

sending, by the second terminal, battery voltage request information to the first terminal;

replying, by the first terminal, information on a battery voltage of the first terminal to the second terminal; and receiving, by the second terminal, the information on the battery voltage replied by the first terminal, comparing, by the second terminal, the battery voltage of the first terminal and that of the second terminal, and sending, by the second terminal, the mode switch request information to the first terminal in the case where the battery voltage of the first terminal minus that of the second terminal is greater than a predetermined value.

In a sixth possible implementation based on the third possible implementation, before sending, by the second terminal, the mode switch request information to the first terminal, the method further includes:

determining, by the second terminal, whether a total transmitting time of the second terminal is longer than a predetermined time, and sending, by the second terminal, the mode switch request information to the first terminal in the case where the total transmitting time of the second terminal is longer than the predetermined time.

As can be seen from above, in some possible implementations of the disclosure, the function of a conventional base station or repeater can be achieved with two portable terminals, which more than doubles the valid communication range of a conventional system, has the advantages of being easy to carry, economic and flexible and fully adapts to the application requirements of a conventional communication system.

BRIEF DESCRIPTION OF THE DRAWINGS

The drawings to be used in embodiments are described briefly as follows, so that technical solutions according to the embodiments of the disclosure or according to conventional technology may become clearer. Apparently, the drawings in the following descriptions only illustrate some embodiments of the disclosure. For those in the art, other drawings may be obtained based on these drawings without any creative work.

DETAILED DESCRIPTION

Technical solutions according to embodiments of the disclosure are described clearly and completely hereinafter in conjunction with the drawings according to the embodiments of the disclosure. Apparently, the described embodiments are only a part rather than all of the embodiments according to the present disclosure. Any other embodiments obtained by those skilled in the art based on the embodiments in the present disclosure without any creative work fall in the scope of the disclosure.

A portable system for forwarding a wireless signal, a method for forwarding a wireless signal and a terminal are provided according to embodiments of the disclosure, and the core idea thereof is that two portable terminals are respectively used as a transmitter and a receiver in a forwarding system, thereby providing a portable and flexible wireless signal forwarding solution. Respective detailed descriptions thereof are as follows.

Embodiment 1

Figure 1:
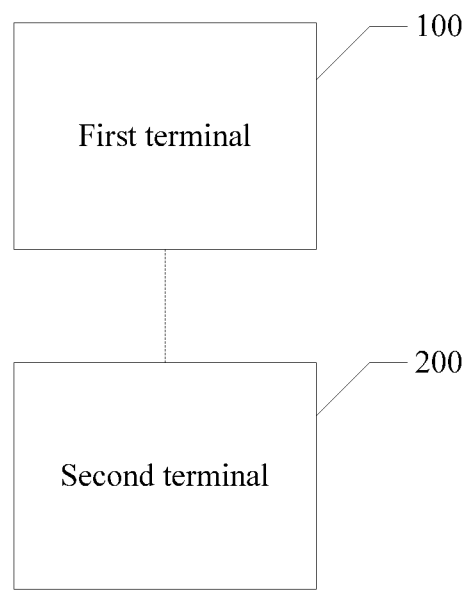
FIG. 1 is a first schematic structural diagram of a portable system for forwarding a wireless signal according to embodiment 1 of the disclosure.

As illustrated in FIG. 1, a portable system for forwarding a wireless signal is provided according to the present disclosure, which includes a first terminal 100 and a second terminal 200.

Figure 2:
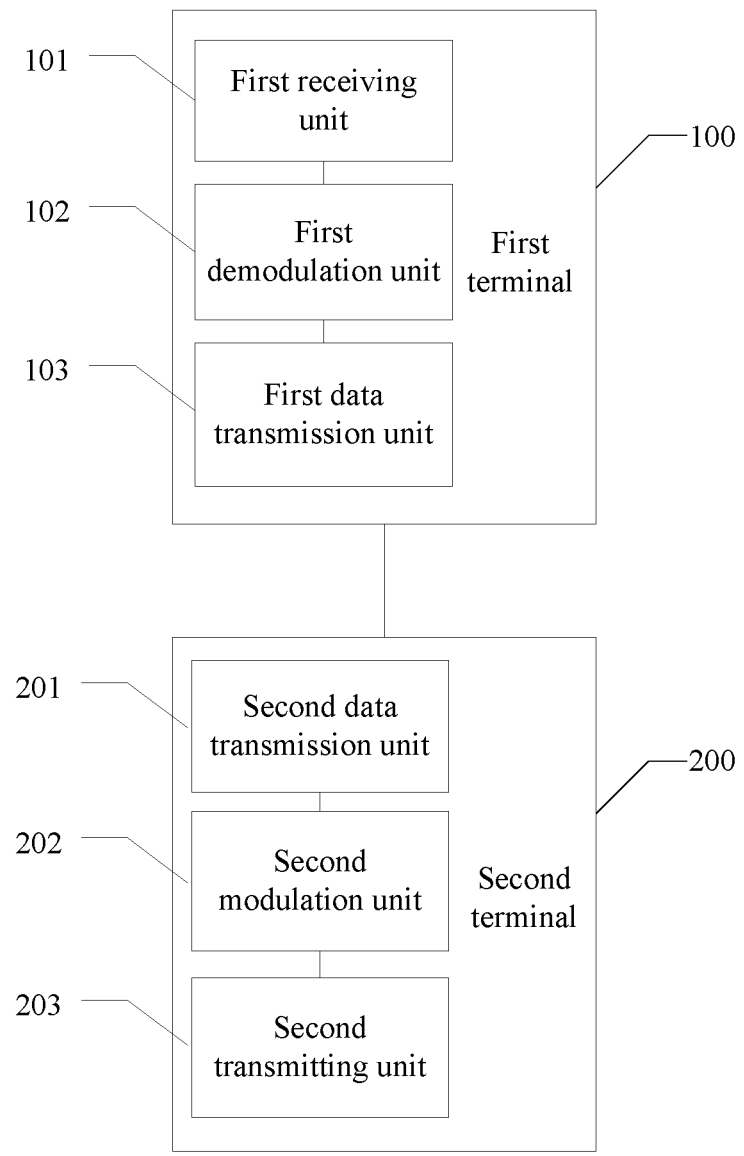
FIG. 2 is a second schematic structural diagram of the portable system for forwarding a wireless signal according to embodiment 1 of the disclosure.

As illustrated in FIG. 2, the first terminal 100 includes:

a first receiving unit 101, configured to receive a wireless signal;

a first demodulation unit 102, configured to demodulate the wireless signal above, to obtain burst data and a timeslot number, where the wireless signal may be demodulated to 264-bit burst data prescribed by the DMR (Digital Mobile Radio) standard; and a first data transmission unit 103, configured to send the burst data and the timeslot number obtained by the demodulating to the second terminal.

And the second terminal 200 includes:

a second data transmission unit 201, configured to receive the burst data and the timeslot number above sent by the first data transmission unit 103;

a second modulation unit 202, configured to perform a signal modulation on the burst data above; and a second transmitting unit 203, configured to transmit a signal obtained through the signal modulation, in a timeslot corresponding to the timeslot number above.

In the embodiment, a first terminal and a second terminal are coupled with each other to form a forwarding system. In the system, the first terminal 100 may support a receiver operation mode, and the second terminal 200 may support a transmitter operation mode. When operating in the receiver operation mode, the first terminal is configured only to perform processing steps related to signal receiving, and preferably, units related to a transmitting function of the first terminal are shut down or turned into a sleeping state to save a power consumption of the first terminal. When operating in the transmitter operation mode, the second terminal is configured only to perform processing steps related to signal transmitting, and preferably, units related to a receiving function of the second terminal are shut down or turned into a sleeping state to save a power consumption of the second terminal.

In the embodiment, the portable system for forwarding a wireless signal may include two portable terminals coupled with each other. Specifically, the first terminal 100 and the second terminal 200 may be coupled with each other in a wired manner or a wireless manner to switch terminal data and synchronize to achieve a forwarding function. The two terminals in the forwarding system may perform a signal receiving function and a signal transmitting function of the forwarding system separately. The first terminal or the second terminal in the embodiment may be but not limited to a handhold terminal (for example, a digital interphone terminal) or a vehicle-station. The system for forwarding a wireless signal may be formed by two handhold terminals or two vehicle-stations, which can achieve the function of a conventional base station or a repeater and more than doubles the valid communication range of a conventional system. In addition, since the forwarding system are formed by two conventional portable terminals, the forwarding system has the advantages of being portable, economic and flexible compared with a repeater in conventional technology, thus fully adapting to the application requirements of a conventional communication system.

Optionally, the portable system for forwarding a wireless signal may perform a same frequency forwarding by using a conventional protocol.

The process of that the forwarding system according to the embodiment of the disclosure performs a same frequency forwarding by using a conventional protocol is described as follows.

The first receiving unit 101 receives a wireless signal in a first timeslot of a first frequency point, the first demodulation unit 102 demodulates the wireless signal, to obtain burst data and a timeslot number of the first timeslot, and the first data transmission unit 103 sends the burst data and the timeslot number of the first timeslot obtained by the demodulating to the second terminal. After the second data transmission unit 201 receives the burst data and the timeslot number of the first timeslot, the second modulation unit 202 performs a signal modulation on the received burst data, and the second transmitting unit 203 transmits a signal obtained through the signal modulation, in a second timeslot based on the timeslot number of the first timeslot by using the first frequency point, where the second timeslot is a timeslot different from the first timeslot. For example, a terminal A and a terminal B communicate with each other by using the same frequency point F1. In the case where the terminal A sends a voice or data to the terminal B in a timeslot 1 by using a transmitting frequency point F1, a receiver (first terminal 100) of the portable system for forwarding a wireless signal receives an unlink signal from the terminal A in the timeslot 1 of the frequency point F1, performs a signal demodulation and sends burst data and a timeslot number 1 obtained through the signal demodulation to a transmitter (the second terminal 200) through a transmission wire. The transmitter performs a signal modulation on the received burst data, and transmits a signal obtained through the signal modulation in an adjacent timeslot 2 by using the frequency point F1 of the transmitter. Thus, the terminal B may receive signals transmitted by the terminal A and the transmitter of the forwarding system in the timeslot 1 and the timeslot 2, respectively, and can select a better signal by a field intensity or any other selection mechanism to receive, thereby the portable wireless signal forwarding system according to the embodiment achieves a signal forwarding function. The system may achieve the same frequency forwarding function by using the same direct communication protocol as a conventional terminal, which can be called a direct communication mode. In this mode, a mobile terminal can directly communicate with one or more other mobile terminals by using the same frequency point without any auxiliary device (for example, a repeater). Specific to the embodiment, the terminal A can directly communicate with the receiver, and the terminal B can directly communicate with the transmitter. In the case where the portable system for forwarding a wireless signal according to the embodiment operates in the direct communication mode, the system can be formed by conventional terminals without any modifications and it is only required to switch an operation mode of the forwarding system. Generally, a repeater achieves a forwarding function by using a forwarding protocol, while the system according to the embodiment can achieve a basic forwarding function without adding a support for the forwarding protocol.

When performing the same frequency forwarding by using the conventional protocol, the system only supports to forward one call, and a same frequency disturbance and a self-excitation can be avoided because the system achieves the same frequency forwarding by transmitting and receiving in different timeslots.

Optionally, the portable system for forwarding a wireless signal may perform a different frequency forwarding by using a forwarding protocol. When performing the different frequency forwarding by using the forwarding protocol, the system can achieve a function of forwarding two calls simultaneously by using the same forwarding protocol as a conventional repeater.

In forwarding a first call, the first receiving unit 101 receives a first wireless signal in a first timeslot of a first frequency point, the first demodulation unit 102 performs a signal demodulation on the first wireless signal to obtain first burst data and a first timeslot number and the first transmission unit 103 sends the first burst data and the first timeslot number to the second terminal. The second transmission unit 201 receives the first burst data (obtained by demodulating the first signal) and the timeslot number, and the second transmitting unit 203 performs a signal transmitting in the first timeslot by using a second frequency point after the second modulation unit 202 performs a signal modulation on the first burst data.

In forwarding a second call, the first receiving unit 101 receives a second wireless signal in a second timeslot of the first frequency point, the first demodulation unit 102 performs a signal demodulation on the second wireless signal to obtain second burst data and a second timeslot number, and the first transmission unit 103 sends the second burst data and the second timeslot number to the second terminal. The second transmission unit 201 receives the second burst data (obtained by demodulating the second signal) and the second timeslot number, and the second transmitting unit 203 performs a signal transmitting in the second timeslot by using the second frequency point after the second modulation unit 202 performs a signal modulation on the second burst data.

For example, in the case where a terminal A sends a voice or data to a terminal B in a timeslot 1 by using a transmitting frequency point F1, a receiver (the first terminal) of the portable system for forwarding a wireless signal receives an unlink signal from the terminal A in the timeslot 1 of frequency point F1, performs a signal demodulation and sends burst data and a timeslot number 1 obtained through the signal demodulation to a transmitter (the second terminal) through a transmission wire. The transmitter sends a signal in the timeslot 1 by using a frequency point F2 of the transmitter after performing a signal modulation on the received data. The terminal B receives the signal from the transmitter in the timeslot 1, decodes the signal and accesses the call if the terminal B determines the call is for itself.

It should be noted that a software modification on a conventional terminal (for example, an interphone or a vehicle-station) may be needed in the case where the portable system for forwarding a wireless signal performs the different frequency forwarding by using the forwarding protocol. Specifically, a DMR forwarding protocol is added to the terminal, and how to add the DMR forwarding protocol to a software system of the terminal is not described herein for related contents are common knowledge.

Optionally, to balance battery powers of the first terminal 100 and the second terminal 200 and avoid the situation that a battery power of one of the terminals is too low for the system to operate, roles of the first terminal 100 and the second terminal 200 can be switched, i.e., the first terminal 100 supports a transmitter operation mode to perform a signal transmitting as a transmitter and the second terminal 200 supports a receiver operation mode to perform a signal receiving as a receiver.

In the case where it is required to switch operation modes of the two terminals, the second data transmission unit 201 is configured to send mode switch request information to the first terminal 100, and the first data transmission unit 103 is configured to receive the mode switch request information above, and replied mode switch acknowledgement information to the second terminal 200.

Figure 3:
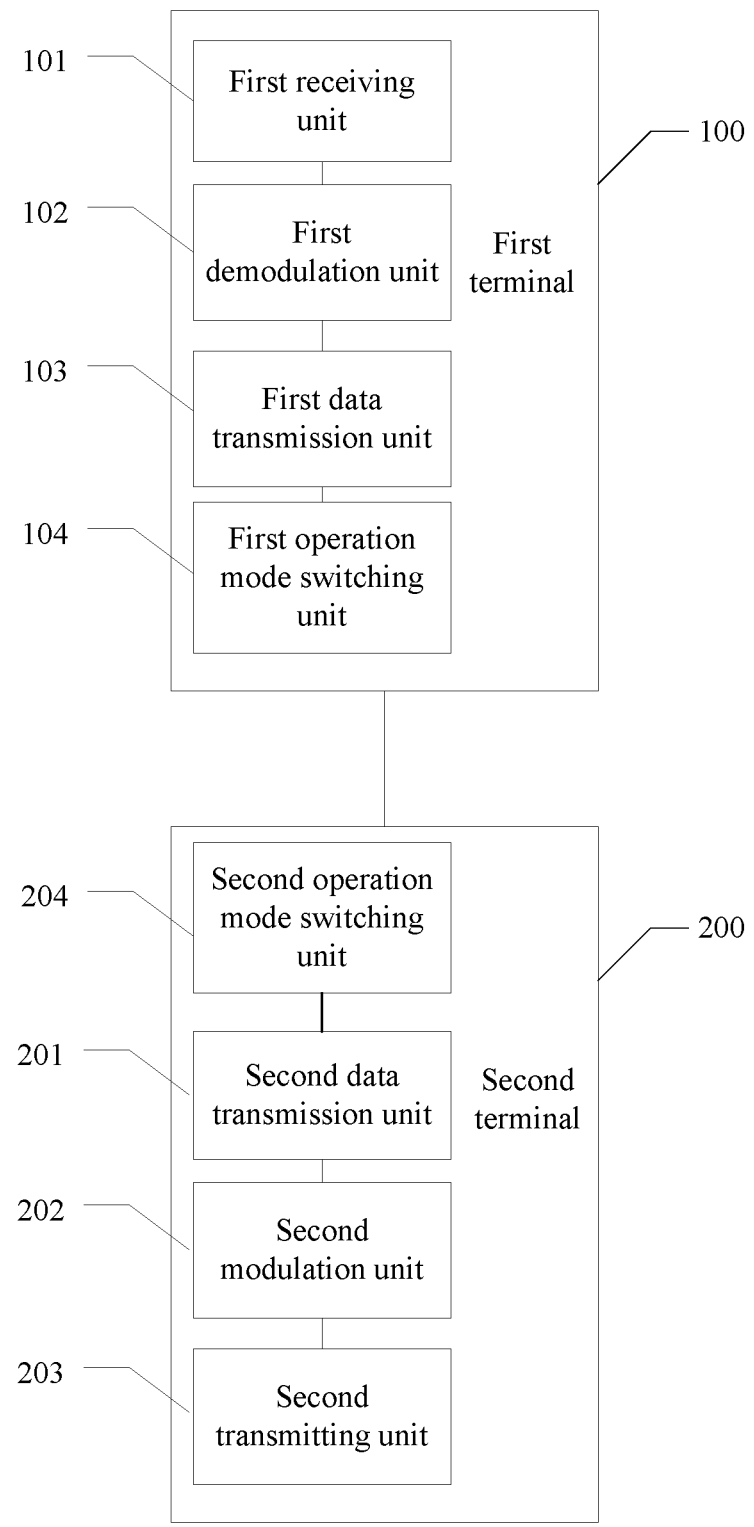
FIG. 3 is a third schematic structural diagram of a portable system for forwarding a wireless signal according to embodiment 1 of the disclosure.

As illustrated in FIG. 3, the first terminal 100 further includes:

a first operation mode switching unit 104, configured to switch an operation mode of the first terminal 100 to the transmitter operation mode in response to the mode switch request information above.

After switching an operation mode to the transmitter operation mode, the first terminal only performs processing steps related to signal transmitting, and no longer performs processing steps related to signal receiving. Preferably, functional units related to signal receiving of the first terminal may be shut down or turned into a sleeping state to save a power consumption of the first terminal.

The second data transmission unit 201 is further configured to receive the mode switch acknowledgement information sent by the first data transmission unit 103.

As illustrated in FIG. 3, the second terminal 200 further includes:

a second operation mode switching unit 204, configured to switch an operation mode of the second terminal above to the receiver operation mode above in response to the mode switch acknowledgement information.

The second terminal switches an operation mode to the receiver operation mode after receiving the mode switch acknowledgement information, and finally, the roles of the two terminals are interchanged.

After switching an operation mode to the receiver operation mode, the second terminal only performs processing steps related to signal receiving, and no longer performs processing steps related to signal transmitting. Preferably, functional units related to signal transmitting of the second terminal may be shut down or turned into a sleeping state to save a power consumption of the second terminal.

Figure 4:
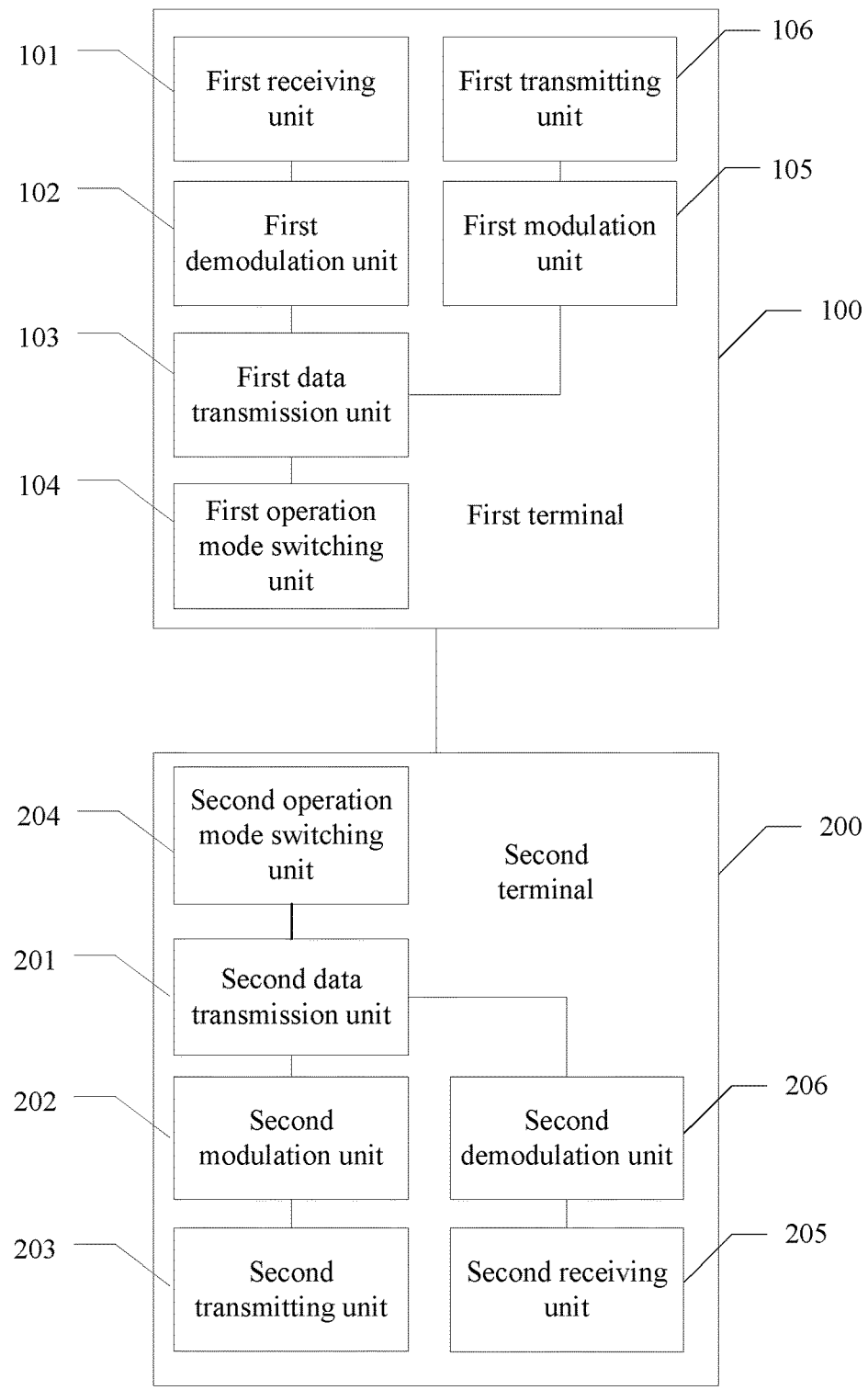
FIG. 4 is a fourth schematic structural diagram of a portable system for forwarding a wireless signal according to embodiment 1 of the disclosure.

Furthermore, in the case where the second terminal 200 operates in the receiver operation mode, as illustrated in FIG. 4, the second terminal 200 further includes:

a second receiving unit 205, configured to receive a wireless signal; and a second demodulation unit 206, configured to demodulate the wireless signal received by the second receiving unit 205, to obtain burst data and a timeslot number.

The second data transmission unit 201 is further configured to send the burst data and the timeslot number obtained by the demodulating of the second demodulation unit 206 to the first terminal 100.

In the case where the first terminal 100 operates in the transmitter operation mode, the first data transmission unit 103 is further configured to receive the burst data and the timeslot number sent by the second data transmission unit 201, and the first terminal 100 further includes:

a first modulation unit 105, configured to perform a signal modulation on the burst data sent by the second data transmission unit 201; and a first transmitting unit 106, configured to transmit a signal obtained through the signal modulation performed by the first modulation unit 105 in a timeslot corresponding to the timeslot number received by the first data transmission unit.

After the operation modes are interchanged, the first terminal becomes a transmitter in the forwarding system and the second terminal becomes a receiver in the forwarding system. After the operation modes are interchanged, functions of the first terminal and the second terminal are interchanged accordingly, and reference can be made to foregoing descriptions for details, which is not described herein.

Interchanging of the operation modes of the first terminal 100 and the second terminal 200 may be triggered in various manners which include, but are not limited to, manner 1 and manner 2.

Manner 1

The second terminal 200 sends battery voltage request information to the first terminal 100, and the first data transmission unit 103 receives the request information and replies a battery voltage V1 of the first terminal 100 to the second terminal.

The second terminal further includes:

a first determination unit, configured to compare the battery voltage V1 of the first terminal with a battery voltage V2 of the second terminal and determine whether V1 minus V2 is greater than a predetermined value (for example, but not limited to, 0.2V).

In the case where the first determination unit determines that V1 minus V2 is greater than the predetermined value, interchanging of the operation modes is triggered, i.e., the second terminal sends mode switch request information to the first terminal 100 by the second data transmission unit 201. It should be noted that battery powers of the two terminals can be compared by comparing battery voltages, for the battery voltages decrease as the battery powers are consumed.

Manner 2

The second terminal 200 further includes:

a timing unit, configured to calculate a total transmitting time of the second terminal 200; and a second determination unit, configured to determine whether the total transmitting time of the second terminal is longer than a predetermined time (for example, but not limited to, 5 minutes), where the second terminal 200 sends mode switch request information to the first terminal by the second data transmission unit 201 in the case where the second determination unit determines that the total transmitting time of the second terminal is longer than the predetermined time.

It should be noted that those skilled in the art may choose either of the two trigger manners or a combination of the two manners, or choose other appropriate trigger manner, which is not limited herein.

For example, in the embodiment, the terminal 100 and the terminal 200 may be connected through GPIO (General-Purpose Input/Output), to achieve a timing synchronization through GPIO; and the terminal and the terminal may be connected through USB (Universal Serial Bus) or UART (Universal Asynchronous Receiver/Transmitter), to achieve a data transmission. Of course, those skilled in the art may adopt any other appropriate connection to connect the first terminal and the second terminal, which is not limited herein.

It should be noted that the timing synchronization method and the data transmission mode of the first terminal 100 and the second terminal 200 belong to conventional technology, which are not described herein.

It should also be noted that after receiving a wireless signal, the first terminal 100 (or the second terminal) may perform other signal processing steps, such as correcting, decoding and de-framing on the wireless signal, and accordingly, the second terminal 200 (or the first terminal) may perform related signal processing steps, such as framing and channel coding, which are not described herein for related contents belong to conventional technology.

For example, in the embodiment, an operation flow of the first terminal 100 which is operating in the receiver operation mode includes:

1, staying in an initial receiving state of RX_Not_In_Call before receiving a call;

2, switching to a data receiving state (RX_DATA) and starting a mobile terminal activity timer on detecting a signal sent by a mobile terminal in an uplink;

3, demodulating the received signal to 264-bit burst data prescribed by the DMR standard;

4, sending the 264-bit burst data above and a timeslot number to the second terminal 200 operating in the transmitter operation mode; and 5, recovering to the initial receiving state of RX_Not_In_Call, in the case where a last data frame (for example, EOR) which indicates to end the receiving is received or no data is received when the timer expires.

For example, in the embodiment, an operation flow of the second terminal 200 which is operating in the transmitter operation mode includes:

1, staying in an initial transmitting state of TX_Not_In_Call when no data is received;

2, on receiving a wake-up message of a mobile terminal from a receiver (the first terminal 100), switching to an idle transmitting channel state (TX_Channel_Hangtime), starting to transmit an idle frame to notify all mobile terminals that the channel is idle, performing a timing synchronization with the receiver through GPIO and starting a mobile terminal activity detection timer;

3, in the idle transmitting channel state, switching to a data forwarding state (TX_Repeating_Data) on receiving burst data transmitted by the receiver, to receive the burst data and a timeslot number, performing a signal modulation on the burst data and forwarding in a corresponding timeslot;

4, starting the mobile terminal activity detection timer and switching to the idle transmitting channel state in the case where a data frame (for example, EOR) which indicates to end the receiving is received in the data forwarding state; and 5, switching to the initial transmitting state of TX_Not_In_Call in the case where the mobile terminal activity detection timer expires in the idle transmitting channel state.

In addition, after finishing the data forwarding, the transmitter (the second terminal) may further determine whether a total transmitting time of the transmitter is longer than a predetermined time. If the total transmitting time of the transmitter is longer than the predetermined time, the transmitter notifies the receiver (the first terminal) to switch an operation mode, to interchange operation modes of the first terminal and the second terminal. If the total transmitting time of the transmitter is shorter than the predetermined time, the transmitter sends battery voltage request information to the receiver to obtain a battery voltage of the first terminal, and compares battery voltages of the two terminals. If the battery voltage of the receiver minus that of the transmitter is greater than a predetermined value, the transmitter notifies the receiver to switch an operation mode, to interchange the operation modes of the first terminal and the second terminal, otherwise current operation modes of the two terminals remain unchanged.

Embodiment 2

A terminal is further provided according to the present disclosure. The terminal includes:

a first receiving unit, configured to receive a wireless signal;

a first demodulation unit, configured to demodulate the wireless signal above, to obtain burst data and a timeslot number; and a first data transmission unit, configured to send the burst data and the timeslot number obtained by the demodulating to a second terminal, for the second terminal to perform a signal modulation on the burst data and transmit a signal obtained through the signal modulation in a timeslot corresponding to the timeslot number.

That is, the terminal can operate in a receiver operation mode, to perform related processing steps of receiving and demodulating a wireless signal and send the obtained burst data and a timeslot number to a second terminal operating in a transmitter operation mode for the second terminal to perform processing steps related to signal transmitting, thereby achieving a forwarding of the wireless signal.

Furthermore, the terminal further supports a transmitter operation mode, and the first data transmission unit above is further configured to receive mode switch request information sent by the second terminal above, and reply mode switch acknowledgement information to the second terminal above.

The terminal further includes:

a first operation mode switching unit, configured to switch an operation mode of the terminal above to the transmitter operation mode in response to the mode switch request information above.

In the case where the terminal above operates in the transmitter operation mode, the first data transmission unit above is further configured to receive burst data and a timeslot number sent by the second terminal above, and the terminal above further includes:

a first modulation unit, configured to perform a signal modulation on the burst data sent by the second terminal above; and a first transmitting unit, configured to transmit a signal obtained through the signal modulation performed by the first modulation unit above in a timeslot corresponding to the timeslot number sent by second terminal.

It should be noted that the terminal provided according to the embodiment may have the same structure and perform the same functions as the first terminal according to embodiment 1, and reference can be made to related descriptions in embodiment 1 for details.

Embodiment 3

A terminal is further provided according to the present disclosure. The terminal includes:

a second data transmission unit, configured to receive burst data and a timeslot number sent by a first terminal, where the burst data and the timeslot number above are obtained by the first terminal above demodulating a wireless signal received by the first terminal;

a second modulation unit, configured to perform a signal modulation on the burst data above; and a second transmitting unit, configured to transmit a signal obtained through the signal modulation in a timeslot corresponding to the timeslot number above.

That is, the terminal can operate in a transmitter operation mode, to receive burst data sent by the first terminal operating in a receiver operation mode and perform processing steps related to signal transmitting, thereby achieving a forwarding of the wireless signal.

Furthermore, the terminal above may further support a receiver operation mode, and the second data transmission unit may be further configured to send mode switch request information to the first terminal above and receive mode switch acknowledgement information replied by the first terminal above.

The terminal further includes:

a second operation mode switching unit, configured to switch an operation mode of the terminal above to the receiver operation mode above in response to the mode switch acknowledgement information above, and in the case where the terminal operates in the receiver operation mode, the terminal further includes:

a second receiving unit, configured to receive a wireless signal;

a second demodulation unit, configured to demodulate the wireless signal received by the second receiving unit, to obtain burst data and a timeslot number.

The second data transmission unit above is further configured to send the burst data and the timeslot number above obtained by the demodulating of the second demodulation unit to the first terminal above.

It should be noted that the terminal provided according to the embodiment may have the same structure and perform the same functions as the second terminal according to embodiment 1, and reference can be made to related descriptions in embodiment 1 for details.

Embodiment 4

Figure 5:
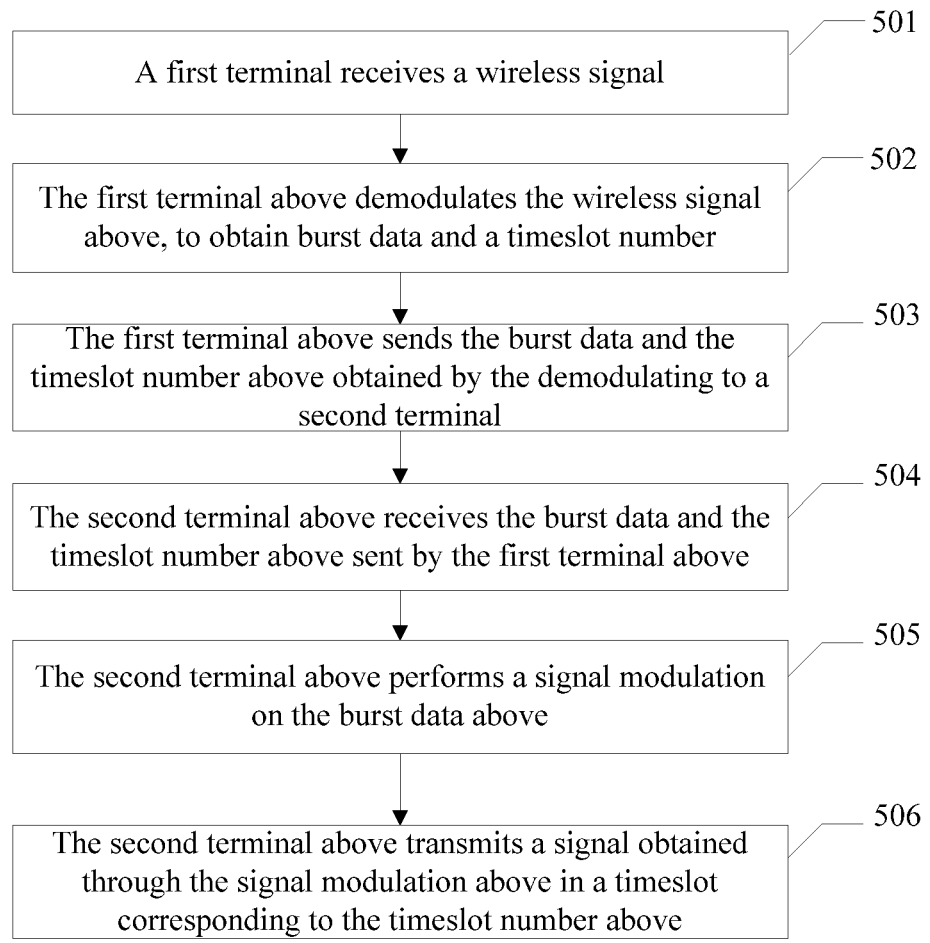
FIG. 5 is a first schematic flowchart of a method for forwarding a wireless signal according to embodiment 4 of the disclosure.

A method for forwarding a wireless signal is provided according to the present disclosure. As illustrated in FIG. 5, the method includes steps 501 to 506.

In step 501, a first terminal receives a wireless signal.

In step 502, the first terminal above demodulates the wireless signal above, to obtain burst data and a timeslot number. Specifically, the first terminal may demodulate the wireless signal to 264-bit burst data prescribed by the DMR standard.

In step 503, the first terminal above sends the burst data and the timeslot number above obtained by the demodulating to a second terminal.

In step 504, the second terminal above receives the burst data and the timeslot number above sent by the first terminal above.

In step 505, the second terminal above performs a signal modulation on the burst data above.

In step 506, the second terminal above transmits a signal obtained through the signal modulation above in a timeslot corresponding to the timeslot number above.

In the embodiment, the first terminal and the second terminal may be coupled with each other. In the system, the first terminal may support a receiver operation mode, and the second terminal may support a transmitter operation mode, to execute the method for forwarding a wireless signal. When operating in the receiver operation mode, the first terminal is configured only to perform processing steps related to signal receiving, and preferably, units related to a transmitting function of the first terminal are shut down or turned into a sleeping state to save a power consumption of the first terminal. When operating in the transmitter operation mode, the second terminal is configured only to perform processing steps related to signal transmitting, and preferably, units related to a receiving function of the second terminal to save a power consumption of the second terminal.

In the embodiment, the first terminal and the second terminal may be coupled with each other in a wired manner or a wireless manner to switch terminal data and perform synchronization to achieve a forwarding function. The first terminal or the second terminal in the embodiment may be but not limited to a handhold terminal (for example, a digital interphone terminal) or a vehicle-station. The two terminals may perform the signal receiving function and the signal transmitting function separately, so that the forwarding of a signal can be achieved and the valid communication range of conventional communication can be more than doubled. In addition, since the method for forwarding a wireless signal is executed by two portable conventional terminals, the method has advantages of being portable, economic and flexible compared with a forwarding method by using a repeater in conventional technology, thus fully adapting to the application requirements of a conventional communication system.

Optionally, step 501 may include step 501A.

In step 501A, the first terminal above receives a wireless signal in a first timeslot of a first frequency point.

Step 506 may include step 506A.

In step 506A, the second terminal above transmits a signal obtained through the signal modulation, in a second timeslot by using the first frequency point above.

That is, the first terminal and the second terminal may perform a same frequency forwarding by using a conventional protocol, and a same frequency disturbance and a self-excitation can be avoided since the first terminal and the second terminal achieves the same frequency forwarding by transmitting and receiving in different timeslots. The first terminal and the second terminal may operate in a direct communication mode. In the direct communication mode, the first terminal and the second terminal can directly communicate with another terminal. The communication range of a conventional mobile terminal in the direct communication mode can be enlarged without making any modifications on the first terminal and the second terminal except switching an operation mode of the forwarding system. A conventional repeater usually achieves a forwarding function by using a forwarding protocol, while in the method provided according to the embodiment, a basic forwarding function can be achieved without adding a support for the forwarding protocol, and reference can be made to descriptions in embodiment 1 for related contents.

Optionally, step 501 may include steps 501B1 and 501B2.

In step 501B1, a first terminal receives a first wireless signal in a first timeslot of a first frequency point.

And in step 501B2, a first terminal receives a second wireless signal in a second timeslot of a first frequency point.

It should be noted that steps 501B1 and 501B2 have no fixed precedence relationship, and may be performed simultaneously.

Step 502 may include steps 502B1 and 502B2.

In step 502B1, the first terminal above demodulates the first wireless signal above, to obtain first burst data and a first timeslot number.

In step 502B2, the first terminal above demodulates the second wireless signal above, to obtain second burst data and a second timeslot number.

Step 506 may include steps 506B1 and 506B2.

In step 506B1, the second terminal above transmits a signal obtained by modulating the first burst data above, in the first timeslot above by using a second frequency point.

In step 506B2, the second terminal above transmits a signal obtained by modulating the second burst data above, in the second timeslot above by using a second frequency point.

It should be noted that steps 506B1 and 506B2 have no fixed precedence relationship, and may be performed simultaneously, where step 506B1 corresponds to steps 501B1 and 502B1 and step 506B2 corresponds to steps 501B2 and 502B2.

That is, the first terminal and the second terminal can achieve a function of simultaneously forwarding two different frequency signals by using the same forwarding protocol as a conventional repeater, and reference can be made to descriptions in embodiment 1 for details.

Figure 6:
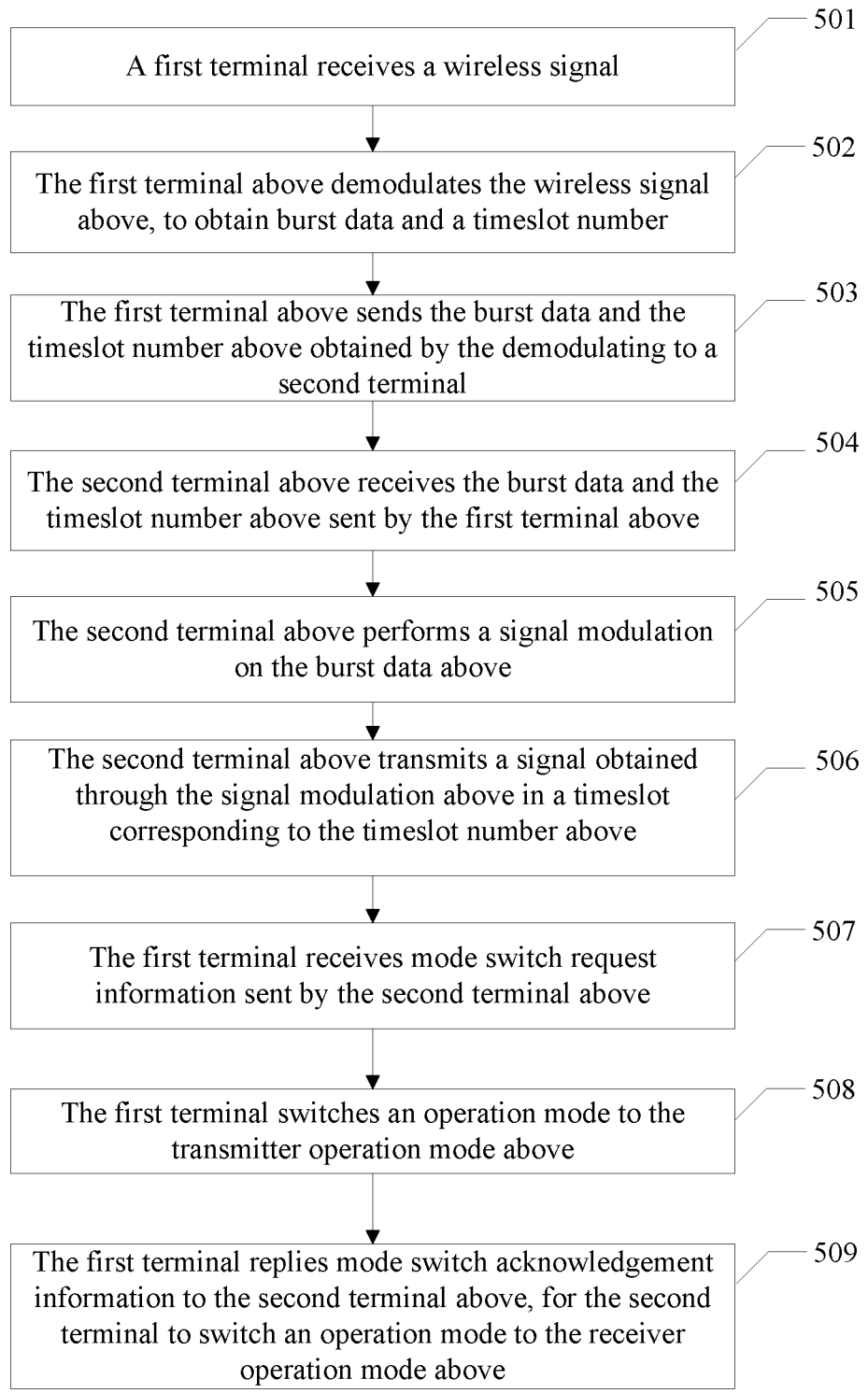
FIG. 6 is a second schematic flowchart of a method for forwarding a wireless signal according to embodiment 4 of the disclosure.

Optionally, as illustrated in FIG. 6, after step 506, the method may further include steps 507 to 509.

In step 507, the first terminal receives mode switch request information sent by the second terminal above.

In step 508, the first terminal switches an operation mode to the transmitter operation mode above.

In step 509, the first terminal replies mode switch acknowledgement information to the second terminal above, for the second terminal to switch an operation mode to the receiver operation mode above.

It should be noted that steps 508 and 509 have no fixed precedence relationship.

After steps 508 and 509 are performed, the interchange of operation modes of the first terminal and the second terminal is completed.

In the case where the first terminal operates in the transmitter operation mode and the second terminal operates in the receiver operation mode, the method further includes:

receiving, by a second terminal operating in the receiver operation mode, a wireless signal;

demodulating, by the second terminal above, the wireless signal received by the second terminal, to obtain burst data and a timeslot number;

sending, by the second terminal, the burst data and the timeslot number obtained by demodulating the received wireless signal to the first terminal above;

receiving, by the first terminal operating in the transmitter operation mode, the burst data and the timeslot number sent by the second terminal;

performing, by the first terminal above, a signal modulation on the burst data sent by the second terminal; and transmitting, by the first terminal, a signal obtained through the signal modulation performed on the burst data sent by the second terminal above, in a timeslot corresponding to the timeslot number sent by the second terminal above.

After the interchange of the operation modes is completed, the first terminal becomes a transmitter in the forwarding system, and the second terminal becomes a receiver in the forwarding system. And after the interchange of the operation modes is completed, functions of the first terminal and the second terminal and flows of the methods performed by the first terminal and the second terminal are also interchanged accordingly, and reference can be made to descriptions in foregoing embodiments for details, which is not described herein.

Figure 7:
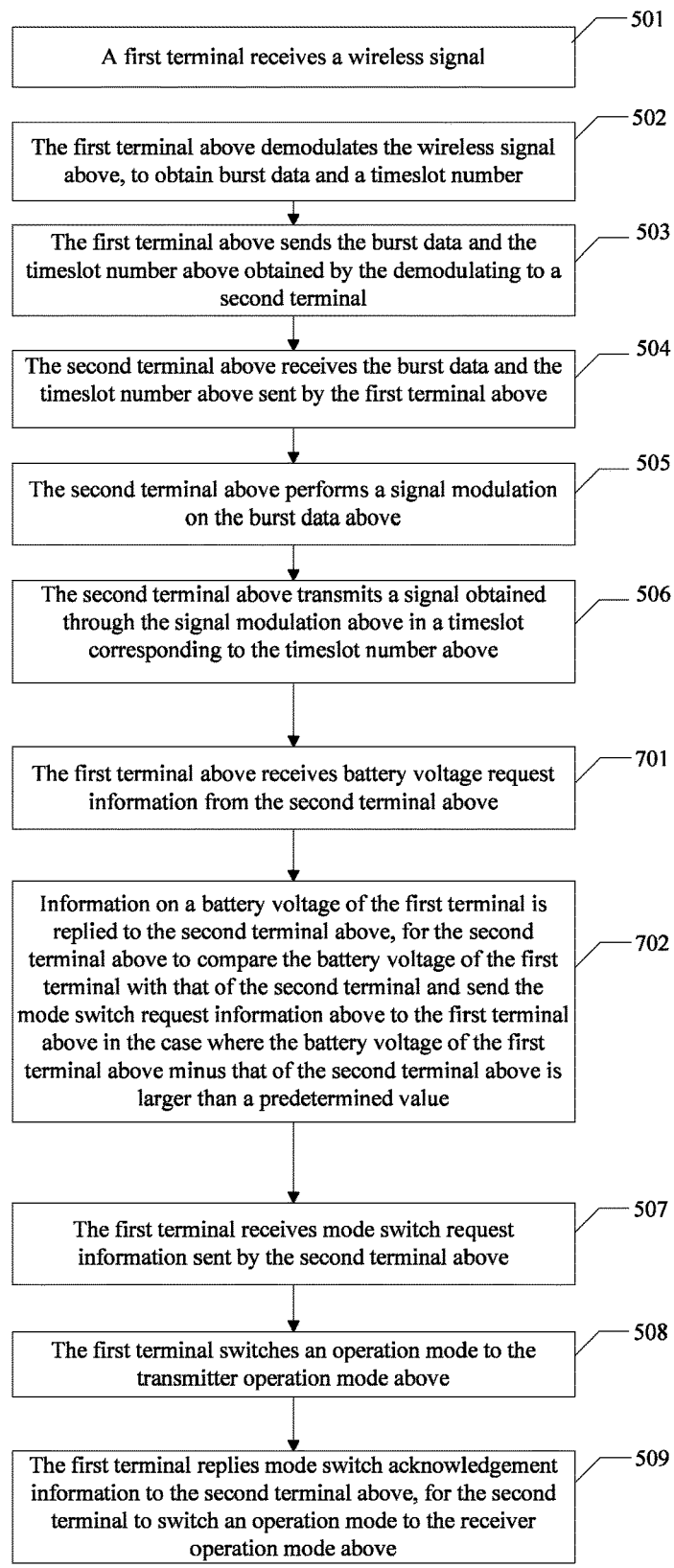
FIG. 7 is a third schematic flowchart of a method for forwarding a wireless signal according to embodiment 4 of the disclosure.

Optionally, as illustrated in FIG. 7, before performing step 507 above, the method may further include steps 701 and 702.

In step 701, the first terminal above receives battery voltage request information from the second terminal above.

In step 702, information on a battery voltage of the first terminal is replied to the second terminal above, for the second terminal above to compare the battery voltage of the first terminal with that of the second terminal and send the mode switch request information above to the first terminal above in the case where the battery voltage of the first terminal above minus that of the second terminal above is greater than a predetermined value (for example, but not limited to, 0.2V).

That is, the second terminal may send request information to the first terminal to acquire information on a battery voltage of the first terminal, and compare battery voltages of the two terminals to determine whether to switch the operation modes of the two terminals.

Figure 8:
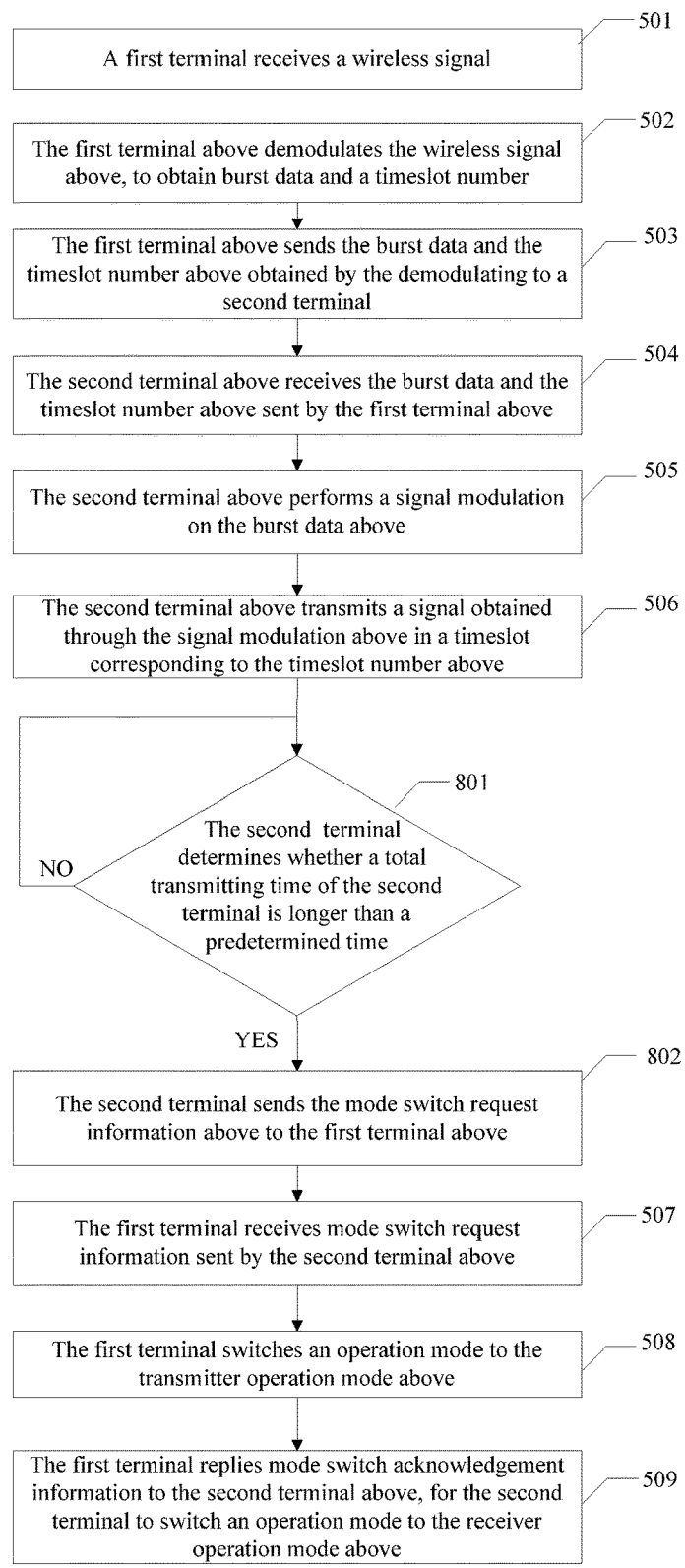
FIG. 8 is a fourth schematic flowchart of a method for forwarding a wireless signal according to embodiment 4 of the disclosure.

Optionally, as illustrated in FIG. 8, before performing step 507 above, the method may further include steps 801 and 802.

In step 801, the second terminal above determines whether a total transmitting time of the second terminal is longer than a predetermined time (for example, but not limited to, 5 minutes), and performing step 802 if the total transmitting time of the second terminal is longer than the predetermined time, otherwise replying to step 801.

In step 802, the second terminal sends the mode switch request information above to the first terminal above.

That is, the second terminal calculates a total transmitting time of the second terminal, and the operation modes of the two terminals are interchanged if the total transmitting time of the second terminal is longer than the predetermined time.

The operation modes of the two terminals are interchanged under a certain condition, so that battery powers of the two terminals can be balanced, to avoid a situation that a battery power of one terminal is too much while a battery power of the other terminal is too low for a system to operate.

Optionally, in the embodiment, the first terminal and the second terminal may be connected with each other through GPIO, to achieve a timing synchronization through GPIO. The first terminal and the second terminal may be connected with each other through USB or UART, to achieve a data transmission. Of course, those in the art may adopt any other appropriate connection to achieve the connection between the first terminal and the second terminal, which is not limited herein.

It should be noted that the foregoing method embodiments are described as combinations of a series of actions for ease of description. Those skilled in the art shall appreciate that the disclosure is not limited to the sequence of the actions described, for some steps may be performed in other sequences or simultaneously according to the present disclosure. In addition, those skilled in the art shall also appreciate that the embodiments described in the specification are only some preferred embodiments and that the actions and modules involved are not necessarily required by the disclosure.

Descriptions of each of the above embodiments emphasize on a unique aspect, and reference can be made to related descriptions in other embodiments to understand a part of an embodiment which is not described in detail.

Those skilled in the art shall understand that a part of or all steps of the methods in the embodiments above may be performed by hardware under an instruction of a program. The program may be stored in a computer readable storage medium, which may be a flash disk, a read-only memory (Read-Only Memory, ROM), a random access memory (Random Access Memory, RAM), a magnetic disk or an optical disk.

The portable system for forwarding a wireless signal, the method for forwarding a wireless signal and the terminal thereof provided according to embodiments of the disclosure are described in details above. The principle and implementations of the disclosure are expounded with some particular embodiments in the present disclosure and the descriptions of the above embodiments are merely used for better understanding the method and core spirit of the disclosure. And modifications can be made on particular implementations and application range by those skilled in the art within the spirit of the disclosure. In summary, the specification should not be interpreted as limiting the disclosure.

The invention claimed is:

1. A portable system for forwarding a wireless signal, comprising a first terminal and a second terminal, wherein, the first terminal comprises:
   a first receiving unit, configured to receive a wireless signal;
   a first demodulation unit, configured to demodulate the wireless signal, to obtain burst data and a timeslot number; and
   a first data transmission unit, configured to send the burst data and the timeslot number to the second terminal;
and the second terminal comprises:
   a second data transmission unit, configured to receive the burst data and the timeslot number sent by the first data transmission unit;
   a second modulation unit, configured to perform a signal modulation on the burst data; and
   a second transmitting unit, configured to transmit a signal obtained through the signal modulation, in a timeslot corresponding to the timeslot number, wherein,
the first data transmission unit is further configured to receive mode switch request information sent by the second terminal, and reply mode switch acknowledgement information to the second terminal,
the first terminal further comprises:
   a first operation mode switching unit, configured to switch an operation mode of the first terminal to a transmitter operation mode in response to the mode switch request;
the second data transmission unit is further configured to send the mode switch request information to the first terminal and receive the mode switch acknowledgement information,
the second terminal further comprises:
   a second operation mode switching unit, configured to switch an operation mode of the second terminal to a receiver operation mode in response to the mode switch acknowledgement information;
   a second receiving unit, configured to receive a wireless signal; and
   a second demodulation unit, configured to demodulate the wireless signal received by the second receiving unit, to obtain burst data and a timeslot number,
wherein the second data transmission unit is further configured to send the burst data and the timeslot number obtained by the demodulating of the second demodulation unit to the first terminal,
and in the case where the first terminal operates in the transmitter operation mode, the first data transmission unit is further configured to receive the burst data and the timeslot number sent by the second data transmission unit and the first terminal further comprises:
   a first modulation unit, configured to perform a signal modulation on the burst data sent by the second data transmission unit; and
   a first transmitting unit, configured to transmit a signal obtained through the signal modulation performed by the first modulation unit in a timeslot corresponding to the timeslot number sent by the second data transmission unit.

2. The system according to claim 1 wherein, the first data transmission unit is further configured to receive battery voltage request information from the second terminal, and reply information on a battery voltage of the first terminal to the second terminal, the second terminal further comprises:
a first determination unit, configured to compare the battery voltage of the first terminal with that of the second terminal to determine whether the battery voltage of the first terminal minus that of the second terminal is greater than a predetermined value,
and the second data transmission unit is further configured to send the mode switch request information to the first terminal in the case where the determination unit determines that the battery voltage of the first terminal minus that of the second terminal is greater than the predetermined value.

3. The system according to claim 1, wherein, the second terminal further comprises:
a timing unit, configured to calculate a total transmitting time of the second terminal; and
a second determination unit, configured to determine whether the total transmitting time of the second terminal is longer than a predetermined time,
and the second data transmission unit is further configured to send the mode switch request information to the first terminal in the case where the second determination unit determines that the total transmitting time of the second terminal is longer than the predetermined time.

4. A terminal, comprising:
a first receiving unit, configured to receive a wireless signal;
a first demodulation unit, configured to demodulate the wireless signal, to obtain burst data and a timeslot number; and
a first data transmission unit, configured to send the burst data and the timeslot number to a second terminal, for the second terminal to perform a signal modulation on the burst data and transmit a signal obtained through the signal modulation in a timeslot corresponding to the timeslot number, wherein,
the terminal further supports a transmitter operation mode, wherein,
the first data transmission unit is further configured to receive mode switch request information sent by the second terminal, and reply mode switch acknowledgement information to the second terminal,
the terminal further comprises:
a first operation mode switching unit, configured to switch an operation mode of the terminal to the transmitter operation mode in response to the mode switch request information,
and in the case where the terminal operates in the transmitter operation mode, the first data transmission unit is further configured to receive burst data and a timeslot number sent by the second terminal and the terminal further comprises:
a first modulation unit, configured to perform a signal modulation on the burst data sent by the second terminal; and
a first transmitting unit, configured to transmit a signal obtained through the signal modulation performed by the first modulation unit, in a timeslot corresponding to the timeslot number sent by second terminal.

5. A terminal, comprising:
a second data transmission unit, configured to receive burst data and a timeslot number sent by a first terminal, where the burst data and the timeslot number are obtained by the first terminal demodulating a wireless signal received by the first terminal;
a second modulation unit, configured to perform a signal modulation on the burst data; and
a second transmitting unit, configured to transmit a signal obtained through the signal modulation, in a timeslot corresponding to the timeslot number, wherein,
the terminal further supports a receiver operation mode, the second data transmission unit is further configured to send mode switch request information to the first terminal and receive mode switch acknowledgement information replied by the first terminal,
the terminal further comprises:
a second operation mode switching unit, configured to switch an operation mode of the terminal to the receiver operation mode in response to the mode switch acknowledgement information,
and in the case where the terminal operates in the receiver operation mode, the terminal further comprises:
a second receiving unit, configured to receive a wireless signal;
a second demodulation unit, configured to demodulate the wireless signal received by the second receiving unit, to obtain burst data and a timeslot number,
wherein the second data transmission unit is further configured to send the burst data and the timeslot number obtained by the demodulating of the second demodulation unit to the first terminal.

6. A method for forwarding a wireless signal, comprising:
receiving, by a first terminal, a wireless signal;
demodulating, by the first terminal, the wireless signal, to obtain burst data and a timeslot number;
sending, by the first terminal, the burst data and the timeslot number to a second terminal;
receiving, by the second terminal, the burst data and the timeslot number sent by the first terminal;
performing, by the second terminal, a signal modulation on the burst data; and
transmitting, by the second terminal, a signal obtained through the signal modulation in a timeslot corresponding to the timeslot number, wherein,
the method further comprises:
sending, by the second terminal, mode switch request information to the first terminal;
switching, by the first terminal, an operation mode to a transmitter operation mode and replying, by the first terminal, mode switch acknowledgement information to the second terminal; and
receiving, by the second terminal, the mode switch acknowledgement information replied by the first terminal and switching, by the second terminal, an operation mode to a receiver operation mode, wherein
the method further comprises:
receiving, by the second terminal, a wireless signal;
demodulating, by the second terminal, the wireless signal received by the second terminal, to obtain burst data and a timeslot number;
sending, by the second terminal, the burst data and the timeslot number obtained by demodulating the wireless signal received by the second terminal to the first terminal;
receiving, by the first terminal, the burst data and the timeslot number sent by the second terminal;
performing, by the first terminal, a signal modulation on the burst data sent by the second terminal; and
transmitting, by the first terminal, a signal obtained through the signal modulation performed on the burst data sent by the second terminal, in a timeslot corresponding to the timeslot number sent by the second terminal.

7. The method according to claim 6, wherein,
receiving, by the first terminal, the wireless signal comprises: receiving, by the first terminal, the wireless signal in a first timeslot of a first frequency point,
and transmitting, by the second terminal, the signal obtained through the signal modulation in the timeslot corresponding to the timeslot number comprises: transmitting, by the second terminal, the signal obtained through the signal modulation, in a second timeslot by using the first frequency point.

8. The method according to claim 6, wherein,
receiving, by the first terminal, the wireless signal comprises:
receiving, by the first terminal, a first wireless signal in a first timeslot of a first frequency point, and
receiving, by the first terminal, a second wireless signal in a second timeslot of the first frequency point;
demodulating, by the first terminal, the wireless signal, to obtain the burst data and the timeslot number comprises:
demodulating, by the first terminal, the first wireless signal, to obtain first burst data and a first timeslot number, and
demodulating, by the first terminal, the second wireless signal, to obtain second burst data and a second timeslot number;
and transmitting, by the second terminal, the signal obtained through the signal modulation, in the timeslot corresponding to the timeslot number comprises:
transmitting, by the second terminal, a signal obtained through the signal modulation performed on the first burst data, in a first timeslot by using a second frequency point, and
transmitting, by the second terminal, a signal obtained through the signal modulation performed on the second burst data, in a second timeslot by using a second frequency point.

9. The method according to claim 6, wherein, before sending, by the second terminal, mode switch request information to the first terminal, the method further comprises:
sending, by the second terminal, battery voltage request information to the first terminal;
replying, by the first terminal, information on a battery voltage of the first terminal to the second terminal; and
receiving, by the second terminal, the information on the battery voltage replied by the first terminal, comparing, by the second terminal, the battery voltage of the first terminal and that of the second terminal, and sending, by the second terminal, the mode switch request information to the first terminal in the case where the battery voltage of the first terminal minus that of the second terminal is greater than a predetermined value.

10. The method according to claim 6, wherein, before sending, by the second terminal, the mode switch request information to the first terminal, the method further comprises:
determining, by the second terminal, whether a total transmitting time of the second terminal is longer than a predetermined time, and sending, by the second terminal, the mode switch request information to the first terminal in the case where the total transmitting time of the second terminal is longer than the predetermined time.

* * * * *